2 Sheets—Sheet. 1
L. BISSELL.
Car Truck.
No. 1,794.
Reissued Oct. 18. 1864.
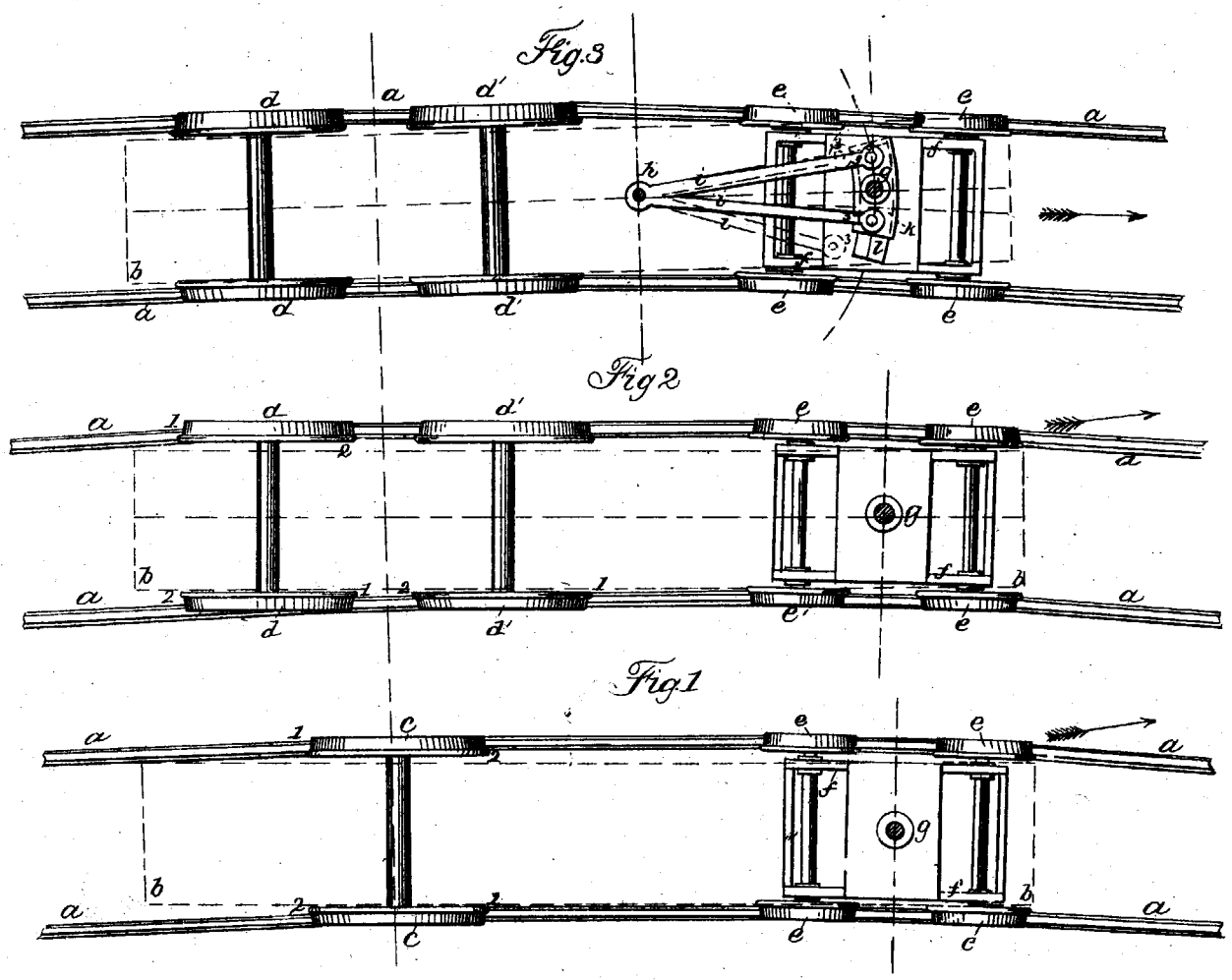
THE NORRIS PETERS CO., WASH. D. C.

2 Sheets—Sheet 2
L. BISSELL.
Car Truck.
No. 1,794.
Reissued Oct. 18. 1864.
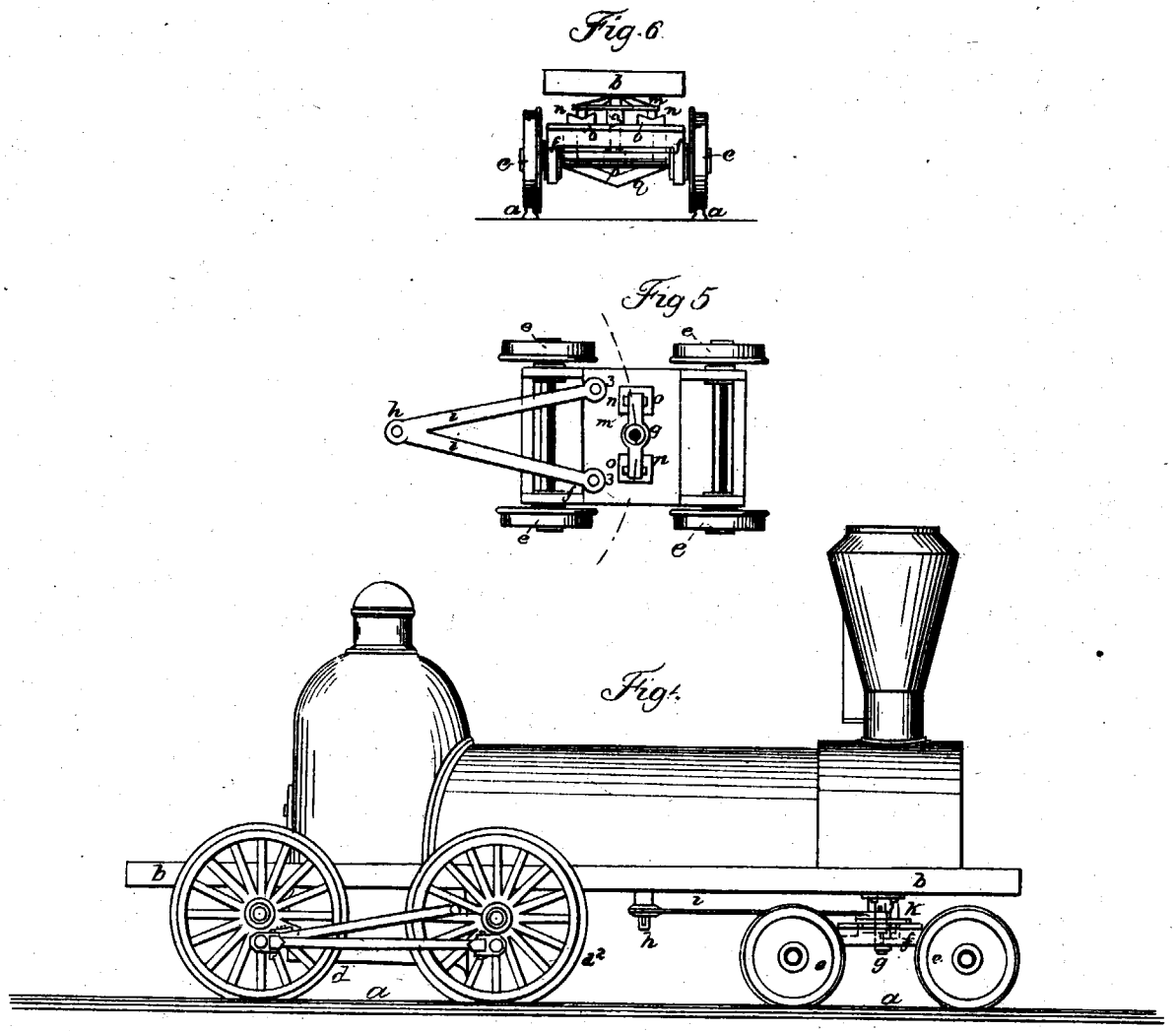
THE NORRIS PETERS CO., WASH. D. C.

UNITED STATES PATENT OFFICE.

LEVI BISSELL, OF NEW YORK, ASSIGNOR TO THE LOCOMOTIVE ENGINE SAFETY TRUCK COMPANY, OF NEW YORK, N. Y.

IMPROVEMENT IN TRUCKS FOR LOCOMOTIVES.

Specification forming part of Letters Patent No. 17,913. dated August 4. 1857; Reissue No. 1,794, dated October 18, 1864.

*To all whom it may concern:*

Be it known that I, LEVI BISSELL, of the city, county, and State of New York, have invented and made certain new and useful Improvements in Trucks for Locomotive-Engines; and I do hereby declare that the following is a full, clear, and exact description of the construction and operation of the same, reference being had to the annexed drawings, making part of this specification, wherein Figures 1 and 2 are plans of the ordinary six and eight wheel locomotives, showing the manner in which the wheels travel on a curved track. Fig. 3 is a similar plan showing the nature of my improvement. Fig. 4 is a side elevation of the same. Fig. 5 is a plan, and Fig. 6 is an end view, showing the details of my truck.

Similar marks of reference denote the same parts.

In order to illustrate fully the nature of my said invention it will be necessary briefly to show the operation of the present locomotive-engines on curved rails, and the reason why they so often run off the track, particularly when meeting with any obstruction or encountering a broken rail, the object of my invention being to keep the axles always at right angles to the rail, whether on a straight or curved track, and prevent the truck swivelling around on its center in case of meeting with any obstruction, and to make the curvature of the rail the means for turning the truck so that the axles thereof shall be parallel or nearly so to the radial line of the curve passing through the center of the truck, in which position they are retained firmly until the track again changes.

*a a* is the railroad-track, shown as on a curved line in Figs. 1, 2, and 3, and the red lines represent the radial lines of said curves at the various points. The platform *b*, or general outline of the engine, is shown in Figs. 1, 2, 3 in blue lines. The ordinary eight-wheeled locomotive, Fig. 2, in running around a curve tends to assume the position shown, crowding the truck and the rear drivers against the outer rail and the forward drivers against the inner rail. The position represented shows the rear drivers practically off the track on the outside. This condition cannot exist in practice to the extent indicated in the figure, but the construction tends necessarily toward such a position of the parts or tends to induce a worse condition—to wit, one in which either the forward drivers or the truck shall yield to the side pressure. In case the forward drivers yield and get off the track on the inside in obedience to the side strain upon them, they are presented to the track in a position which does not aid them in returning. But the greatest evil of all, in addition to the wear and friction due to the side strains on each of these vital parts, is the danger that the forward end may yield instead of the rear or middle. The fact that a straight line or a straight machine cannot coincide with a curved track is obvious. As locomotives are usually constructed this fact tends to induce a great pressure of the center of the machine inward and a pressure of both ends outward. The fact that the truck swivels reduces the evil, but does not get rid of it. There is still a rigid straight line from the center of the truck to the center of the axle of each pair of drivers, and this cannot be exactly in the center line of the track, which is curved. This fact contributes, with the tendency of the machine, to move forward in a straight line to push the truck outward. The truck is constantly by this means borne to the outer side of the curve, and the engine has a tendency to go off in the direction of the arrow, (see Figs. 1 and 2,) particularly in case a broken rail or obstruction occurs, when the truck swivels around on its center-pin, throwing the locomotive off the track. On account of the curvature in the track and the character of the truck the forward pair of drivers, *d d'*, very seldom have flanges, for in such cases the flanges would bind at the points 1 1. By constructing the forward drivers without flanges they are allowed to traverse out of the proper path to a greater extent without involving disaster, but they obviously lose thereby all power of assisting to keep themselves upon the rails and must depend for guidance entirely upon the other wheels, while the rear drivers are worked in a skewed position relatively to the track, and are compelled to make sidewise movements, while the flanges of the truck-wheels press severely against the inside of the outer rail.

For the above reasons curves are very troublesome as well as dangerous, and there is more proportionate wear and injury to the running gear and rails in a short curve than on several miles of straight track.

I construct my truck in such a manner that the axles of the driving-wheels shall be parallel to the radial line of the curve passing through a point between them, so that the drivers have a direct forward-propelling motion along the rails and do not strain or wear the flanges, and so that two or more pairs of drivers can be fitted with flanges. The center line of the locomotive in going around the curve travels in a position tangential to the curve at a point between the drivers, and I fit the truck wheels in such a manner as to allow the truck a transverse motion. This is equivalent to a bending of the locomotive, the said truck swinging laterally upon an axis of motion, *h*, located centrally between the center of the drivers and the center of the truck, or slightly forward of the same, so as to give a slight tendency to the truck to run to the inner side of the curved track.

The two axles of the truck are maintained in a position parallel or nearly so to the radial line, which is central between them, and the axles of the driving-wheels are maintained in a position which is parallel or nearly so to the radial line, which is central between them. Thus all the axles in the entire locomotive, be they more or less in number, are divided into t o systems, the forward axles being firmly held parallel to one line and the hinder ones parallel to another line, and the engine runs around any ordinary curve without much more strain either on the wheels or the track than would be experienced on a straight part of the track. At the same time there is no chance for the truck to turn on its center by any obstruction coming in contact with the wheels. The wheels will pass over a broken rail and not be displaced unless all its wheels are simultaneously unsupported, and even then the truck being set correctly in an angular position with the drivers, will continue to move in the correct direction, and will pass over any obstacle or broken rail and attain the uninjured part of the track. In running on a straight track the truck is held correctly in position, and will run over quite considerable obstructions without being turned aside.

In running an ordinary engine on either a straight or curved track one of the truck-wheels sometimes breaks off and the truck swivels around on its center-pin in consequence and throws the engine off the track; but with my invention one wheel, or even two wheels on opposite sides of the truck, might break off, and still the truck would not run off the track, because its position relatively to the body of the locomotive is firmly maintained.

With my engine the friction on the rails in running around curves is greatly reduced, and I am enabled to maintain a nearly uniform speed without any unusual strain or wear. With ordinary locomotives there is a constant tendency to spread the track and wear the inner sides of the rails and the flanges, all of which are materially reduced by my invention.

In the drawings, *e e*, are the truck-wheels; *f f* the truss or truck-frame. *g* is the center-pin, which in my arrangement changes its character from a center of motion simply to that of a draft-block or pin, while the center of motion is thrown back to the point *h*, which is slightly forward of the center between the drivers *d d*. *k* is a block curved from the center, *h* and fitted to slide in a curved slot, *l*, made in the top plate of the frame *f*, which slot is sufficiently long to allow of the lateral movements of the truck before mentioned when the locomotive is on a curve of the smallest radius that it ever has to travel over. The block *k* might be bolted directly to the under side of the engine, and the curved slot *l* would bring the axles of the wheels *e e* parallel with the radial line, or nearly so; but to allow an easier motion to the parts the said block *k* may be prevented from turning by radius-bars *i* to the center *h*. I, however, prefer that said radius-bars *i* should be attached as at 3 3 to the frame *f*, (see dotted lines Fig. 3, and full lines Fig. 5,) so as to cause the truck to swing on the center *h*, in which case the block *k* may be made use of, or the pin *g* be fitted to move in a curved slot, as shown in Fig. 5.

If the curved block *k* and bars *i* alone were made use of, there would be a vibration of the engine on the truck when running on a straight line and a tendency to move too far by the centrifugal force when on a curve. I therefore obviate this difficulty by providing two inclined planes, *o o*, Figs. 5, 6, formed double, as shown, and of an angle proportioned to the weight of the forward part of the locomotive and the velocity which the locomotive is intended to travel, and fit blocks *n n* on the cross-bar *m*, surrounding the center-pin. The position of the inclines is such that the blocks *n n* rest in the lowest part of the double inclines whan the engine is on a straight track, and on coming onto a curve the inertia of the engine (tending to move in a straight line and cause the truck-wheel flanges to mount the outer rail) is expended in going up the inclines *o o*, as the truck moves laterally toward the inner part of the curve, and on coming onto a straight line the blocks *n* descend by gravity to the bottom of the inclines, and the engine is prevented from acquiring a sidewise or oscillating motion.

The same result will be produced by fitting a thimble, *p*, on the lower end of the center-pin *g*, which rests on inclines *q*, suspended from the frame *f*, or said inclines *q* might be placed centrally on the frame *f*.

Rollers might be substituted for the blocks *n* and thimble *p*, and when required springs may be applied to arrest the motion and prevent the blocks *n* sliding too far up the inclines *o o*, thus regulating the lateral motion of the truck.

Some of the advantages due to certain features of my invention may be separately enumerated, as follows: First, by reason of the facts that the forward portion of the body of the locomotive *b* is so carried upon a truck, *f*, that it is free to move laterally without carrying the truck therewith, and is supported on the truck in such a manner by the blocks *n n* and inclined planes *o o*, or the mechanical equivalents therefor, that the load is raised as it diverges from the center line of the truck and lowered as it again returns to the center line, I am able to produce a locomotive in which the main body is rigid, with its running-gear capable of adapting itself properly to curves, and I also render available the force of gravity in keeping the forward portion of the body in its central position upon the truck while running on straight portions of the track and in restoring it to such position after leaving curves. The force of gravity is always uniform and reliable, and is for these reasons preferable to any other force for this purpose. Second, by reason of the above facts, and also of the further fact that I compel the truck to swivel around the center in proportion as the truck and the body move sidwise relatively to each other, I cause the angular position of the truck to conform to the conditions required on a curve, and also steady the truck in running both on curves and straight lines, so that obstacles may be run over and wheels or axles may fail without allowing the truck to assume a false position.

What I claim as my invention, and desire to secure by Letters Patent, is as follows—

1. Connecting the truck with the frame of the locomotive so that it shall be free to move laterally under the frame, in combination with the means herein described, or the equivalents thereof, by which the weight of the locomotive, resting on the truck, acts automatically to resist the lateral motion of the truck and retain it in a central position while running on the straight parts of the track, and to aid in restoring it to such position when passing from curved to straight parts of the track, substantially as set forth.

2. Connecting the truck and body of the locomotive at a point between the axles of the truck and driving-wheels so that the truck may move laterally under the locomotive, substantially as described, to compel the axles of the truck and driving-wheels to assume positions parallel or nearly so with the radii of the curves of the track, or at right angles with the rails on the straight parts the track, as specified.

LEVI BISSELL.

Witnesses:
D. W. STETSON,
THOMAS D. STETSON.